(12) United States Patent
Petri

(10) Patent No.: US 8,127,225 B2
(45) Date of Patent: Feb. 28, 2012

(54) DOCUMENT SPECIALIZATION PROCESSING IN A CONTENT MANAGEMENT SYSTEM

(75) Inventor: John Edward Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 1008 days.

(21) Appl. No.: 12/019,256

(22) Filed: Jan. 24, 2008

(65) Prior Publication Data

US 2009/0193036 A1    Jul. 30, 2009

(51) Int. Cl.
*G06F 17/00* (2006.01)
*G06F 3/00* (2006.01)

(52) U.S. Cl. ........ 715/234; 715/209; 715/760; 707/609; 707/694

(58) Field of Classification Search .......... 715/200–205, 715/207, 209, 210, 211, 234, 236, 238, 239, 715/240, 242, 243, 247, 249, 251–252, 253, 715/255, 256, 273, 700, 713, 724, 730, 731, 715/744, 760; 707/600, 609, 694, 695
See application file for complete search history.

(56) References Cited

U.S. PATENT DOCUMENTS 6,950,815 B2 *  9/2005  Tijare et al. .......................... 1/1
(Continued)

OTHER PUBLICATIONS

N. Harrison "The Darwin Information Typing Architecture (DITA): Applications for Globalization", IEEE International Professional Communication Conference Proceedings, 2005, pp. 115-121.*

(Continued)

*Primary Examiner* — Maikhanh Nguyen
(74) *Attorney, Agent, or Firm* — Martin & Associates LLC; Derek P. Martin

(57) ABSTRACT

A content management system (CMS) provides a DITA specialization processing mechanism that provides the full functions of a content management system across the full functionality of the DITA architecture. A DITA specialization is used to generate an import descriptor that describes how to import the DITA specialization, which may include required modules, stylesheets, catalogs, and content rules into the repository of a content management system. When the DITA specialization is imported into the repository, a compound document is created with appropriate parent/child links. Dependency relationships between modules in the compound document are then created. In addition, new XML content rules for the DITA specialization may be automatically generated from existing content rules.

3 Claims, 14 Drawing Sheets

U.S. PATENT DOCUMENTS

| | | | |
|---|---|---|---|
| 7,076,728 B2 * | 7/2006 | Davis et al. | 715/205 |
| 7,644,095 B2 * | 1/2010 | Gauthier et al. | 707/999.101 |
| 2006/0101100 A1 * | 5/2006 | Konidena et al. | 707/204 |
| 2006/0173821 A1 * | 8/2006 | Hennum et al. | 707/3 |
| 2007/0094199 A1 * | 4/2007 | Deshpande et al. | 706/47 |
| 2007/0277101 A1 * | 11/2007 | Barber et al. | 715/539 |
| 2009/0106303 A1 * | 4/2009 | Petri | 707/103 R |
| 2009/0113248 A1 * | 4/2009 | Bock et al. | 714/39 |

OTHER PUBLICATIONS

S. Carpenter, "Implementing DITA XML in a Production Environment", ACM, 2002, pp. 17-19.*

Day et al., "Introduction to the Darwin Information Typing Architecture", Updated Oct. 2001, 6 pages.*

Hsiao et al. "Integrated XML Document Management", IBM Almaden Research Center, 2003, pp. 47-67.* http://en.wikipedia.org/wiki/DITA, "Darwin Information Typing Architecture", pp. 1-3, printed Jan. 24, 2008.

http://www.idealliance.org/proceedings/xml05/ship/239/XML_2005_DITA_Documentation...., "DITA, Content Management and XML Authoring", pp. 1-10, printed Jan. 24, 2008.

http://www.drmacros-xml-rants.blogspotcom/2007/03/cms-requirements-for-dita.html, "Dr. Macro's XML Rants", pp. 1-4, printed Jan. 24, 2008.

W. Eliot Kimber, DITA for Practitioners, 2011, XML Press. Retrieved from http://xiruss.org/tutorials/dita-specialization/dita-specialization-tutorial.pdf.

* cited by examiner

```
<?xml version "1.0"?>
<!DOCTYPE household-item SYSTEM "household-item.dtd">
<household-item id "item-id">
   <item-name>Toaster</item-name>
   <item-use>
     <p>For heating one or more pieces of bread until crispy.</p>
   </item-use>
   <related-links>
      <link href "oven.xml"/>
      <link href "microwave.xml"/>
   </related-links>
</household-item>
```

FIG. 7

```
<!-- ================================================================ -->
<!--                         HEADER                                   -->
<!-- ================================================================ -->
<!-- MODULE:    DITA Household Items                                  -->
<!-- VERSION:   1.0                                                   -->
<!-- DATE:      Nov 2007                                              -->
<!--                                                                  -->
<!-- ================================================================ -->

<!-- ================================================================ -->
<!-- SYSTEM:    Darwin Information Typing Architecture (DITA)         -->
<!--                                                                  -->
<!-- PURPOSE:   Define elements and specialization atttributes        -->
<!--            for describing household items                        -->
<!--                                                                  -->
<!-- ORIGINAL CREATION DATE:                                          -->
<!--            Nov 2007                                              -->
<!-- ================================================================ -->

<!-- ================================================================ -->
<!--                    ARCHITECTURE ENTITIES                         -->
<!-- ================================================================ -->

<!-- default namespace prefix for DITAArchVersion attribute can be
     overridden through predefinition in the document type shell    -->
<!ENTITY % DITAArchNSPrefix
                  "ditaarch"                                          >

<!-- must be instanced on each topic type                            -->
<!ENTITY % arch-atts "
           xmlns:%DITAArchNSPrefix;
                  CDATA                       #FIXED
                  'http://dita.oasis-open.org/architecture/2005/'
           %DITAArchNSPrefix;:DITAArchVersion
                  CDATA                       #FIXED
                  '1.1'"                                              >

<!-- ================================================================ -->
<!--                 SPECIALIZATION OF DECLARED ELEMENTS              -->
<!-- ================================================================ -->

<!ENTITY % concept-info-types "%info-types;">

<!-- ================================================================ -->
<!--                       ELEMENT NAME ENTITIES                      -->
<!-- ================================================================ -->

<!ENTITY % household-item   "household-item"                          >
<!ENTITY % item-use         "item-use"                                >
<!ENTITY % item-name        "item-name"                               >
```

FIG. 8

```
<!-- ============================================================ -->
<!--                  DOMAINS ATTRIBUTE OVERRIDE                  -->
<!-- ============================================================ -->

<!ENTITY included-domains ""                                       >

<!-- ============================================================ -->
<!--                     ELEMENT DECLARATIONS                     -->
<!-- ============================================================ -->

<!--                 LONG NAME: Household Item                   -->
<!ELEMENT household-item      ((%item-name;), (%titlealts;)?,
                              (%shortdesc; | %abstract;)?,
                              (%prolog;)?, (%item-use;)?, (%related-links;)?,
                              (%concept-info-types;)* )              >
<!ATTLIST household-item
            id            ID                              #REQUIRED
            conref        CDATA                           #IMPLIED
            %select-atts;
            %localization-atts;
            %arch-atts;
            outputclass
                          CDATA                           #IMPLIED
            domains       CDATA              "&included-domains;"    >

<!--                 LONG NAME: Item Use                         -->
<!ELEMENT item-use       ((%body.cnt;)*, (%section;|%example;)* )    >
<!ATTLIST item-use
            %id-atts;
            %localization-atts;
            outputclass
                          CDATA                           #IMPLIED   >

<!--                 LONG NAME: Item Name                        -->
<!ELEMENT item-name
   (%title.cnt;)*
>
<!ATTLIST item-name
            %id-atts;
            %localization-atts;
            outputclass
                          CDATA                           #IMPLIED
>

<!-- ============================================================ -->
<!--               SPECIALIZATION ATTRIBUTE DECLARATIONS          --> 910
<!-- ============================================================ -->

<!ATTLIST household-item       %global-atts;  class CDATA "- topic/topic
concept/concept household-item/household-item ">
<!ATTLIST item-use       %global-atts;  class CDATA "- topic/body
concept/conbody household-item/item-use ">
<!ATTLIST item-name  %global-atts;  class CDATA "- topic/title concept/
title    household-item/item-name ">

<!-- ================== End DITA Concept  ====================== -->
```

FIG. 9

```
<!-- ============================================================ -->
<!--                    HEADER                                    -->
<!-- ============================================================ -->
<!--  MODULE:    Example Household Items DTD                      -->
<!--  VERSION:   1.0                                              -->
<!--  DATE:      Nov 2007                                         -->
<!--                                                              -->
<!-- ============================================================ -->

<!-- ============================================================ -->
<!-- SYSTEM:     Darwin Information Typing Architecture (DITA)    -->
<!--                                                              -->
<!-- PURPOSE:    DTD to describe household items                  -->
<!--                                                              -->
<!-- ORIGINAL CREATION DATE:                                      -->
<!--             Nov 2007                                         -->
<!-- ============================================================ -->
<!-- ============================================================ -->
<!--              DOMAIN ENTITY DECLARATIONS                      -->
<!-- ============================================================ -->
<!-- ============================================================ -->
<!--              DOMAIN ATTRIBUTE DECLARATIONS                   -->
<!-- ============================================================ -->
<!-- ============================================================ -->
<!--                   DOMAIN EXTENSIONS                          -->
<!-- ============================================================ -->
<!-- ============================================================ -->
<!--                   TOPIC NESTING OVERRIDE                     -->
<!-- ============================================================ -->
<!--              Redefine the infotype entity to exclude         -->
<!--              other topic types and disallow nesting          -->
<!ENTITY % household-item-info-types
                    "no-topic-nesting"
>
<!-- ============================================================ -->
<!--                   TOPIC ELEMENT INTEGRATION                  -->
<!-- ============================================================ -->
<!--              Embed topic to get generic elements             -->
<!ENTITY % topic-type    PUBLIC
"-//OASIS//ELEMENTS DITA Topic//EN"
"topic.mod"                                                       >
%topic-type;
<!--              Embed concept to get specific elements          -->
<!ENTITY % concept-typemod
                    PUBLIC
"-//OASIS//ELEMENTS DITA Concept//EN"
"concept.mod"                                                     >
%concept-typemod;

<!ENTITY % household-items-typemod
  SYSTEM "household-item.mod"
 >
%household-items-typemod;

<!-- ================= End DITA Concept DTD  ==================== -->
```

FIG. 10

```
<i:ImportDescriptor
      xmlns:cd "http://com.ibm.lifesci.score.compounddocument"
      xmlns:i "http://com.ibm.lifesci.score.admin.descriptor"
      xmlns:xsi "http://www.w3.org/2001/XMLSchema-instance"
      xsi:schemaLocation "http://com.ibm.lifesci.score.admin.descriptor
ImportDescriptor.xsd http://com.ibm.lifesci.score.compounddocument
CompoundDocument.xsd">
      <CompoundDocument>
            <LinkedComponent
                  location "C:/configzip/DITA/specializations/Household-item/
household-item.dtd" />
            <LinkedComponent
                  location "C:/configzip/DITA/specializations/Household-item/
household-item.mod" />
            <!-- Concept.mod in the repository -->
            <LinkedComponent
                  objectID "2394857921" />
            <!-- Topic.mod in the repository -->
            <LinkedComponent
                  objectID "2259598749" />
            <LinkedComponent
                  location "C:/configzip/DITA/specializations/Household-item/
Catalog.xml" />
            <LinkedComponent
                  location "C:/configzip/DITA/specializations/Household-item/
household-item-rules.xml" />
            <Attribute name "docType">
                  <Value value "HouseholdItem" />
            </Attribute>
            <Attribute name "document_type">
                  <Value value "HouseholdItem" />
            </Attribute>
            <Attribute name "replaceIfFileExists">
                  <Value value "true" />
            </Attribute>
            <Attribute name "workflow_id">
                  <Value value "NA" />
            </Attribute>
            <Attribute name "title">
                  <Value value "Household-item XML Configuration Set" />
            </Attribute>
            <Attribute name "lifecycleType">
                  <Value value "2" />
            </Attribute>
            <Attribute name "business_admin">
                  <Value value "business admin group" />
            </Attribute>
            <Attribute name "initialStateType">
                  <Value value "steady_state" />
            </Attribute>
            <Attribute name "is_xml_config">
                  <Value value "true" />
            </Attribute>
            <Attribute name "adminImport">
                  <Value value "true" />
            </Attribute>
            <Attribute name "is_template">
                  <Value value "false" />
            </Attribute>
            <Attribute name "name">
                  <Value value "Household-item" />
            </Attribute>
      </CompoundDocument>
</i:ImportDescriptor>
```

FIG. 11

```
<?xml version="1.0" encoding="UTF-8" ?>                    Topic-item-content-rules.xml

- <!--
  XML content rules file for Topic documents
  -->

- <xc:XMLContentRules xmlns:xc="http://com.ibm.lifesci.score.XMLContentRules"
  xmlns:xsi="http://www.w3.org/2001/XMLSchema-instance" xsi:schemaLocation="http://
  com.ibm.lifesci.score.XMLContentRules XMLContentRules.xsd">

- <LinkRules>

- <LinkObjectMappingRule contentXPath="child::*/link/attribute::href"          —— 1410
  doctypeRef="link_doc" initialStateType="steady_state" lifecycleType="2"
  type="automatic" version="CURRENT" relativePath="links/">

- <DefaultAttribute name="state_name">

<DefaultValue>Draft</DefaultValue>

</DefaultAttribute>

</LinkObjectMappingRule>

</LinkRules>

</xc:XMLContentRules>
```

FIG. 14

```xml
<?xml version="1.0" encoding="UTF-8" ?>                    Concept-item-content-rules.xml
<!--
 XML content rules file for Concept documents
-->
<xc:XMLContentRules xmlns:xc="http://com.ibm.lifesci.score.XMLContentRules"
xmlns:xsi="http://www.w3.org/2001/XMLSchema-instance" xsi:schemaLocation="http://
com.ibm.lifesci.score.XMLContentRules XMLContentRules.xsd">
  <ComponentRules>
    <ObjectMappingRule contentXPath="/concept/title" doctypeRef="title_doc"      ——1510
    initialStateType="in_progress" lifecycleType="1" type="automatic"
    version="CURRENT">
      <Variables>
        <VariableDeclaration name="title">
          <ContentXPath xPath="/concept/title/text()" />
        </VariableDeclaration>
      </Variables>
      <DefaultAttribute name="title">
        <DefaultValue>
          <Variable name="title" />
        </DefaultValue>
      </DefaultAttribute>
      <DefaultAttribute name="format">
        <DefaultValue>text/xml</DefaultValue>
      </DefaultAttribute>
      <DefaultAttribute name="state_name">
        <DefaultValue>Draft</DefaultValue>
      </DefaultAttribute>
    </ObjectMappingRule>
  </ComponentRules>
</xc:XMLContentRules>
```

FIG. 15

```xml
<?xml version="1.0" encoding="UTF-8" ?>
<!--
 XML content rules file for Household-item documents
-->
<xc:XMLContentRules xmlns:xc="http://com.ibm.lifesci.score.XMLContentRules"
xmlns:xsi="http://www.w3.org/2001/XMLSchema-instance" xsi:schemaLocation="http://
com.ibm.lifesci.score.XMLContentRules XMLContentRules.xsd">
<ComponentRules>
<ObjectMappingRule contentXPath="/household-item/item-name"
doctypeRef="title_doc" initialStateType="in_progress" lifecycleType="1"
type="automatic" version="CURRENT">
<Variables>
<VariableDeclaration name="title">
<ContentXPath xPath="/household-item/item-name/text()" />
</VariableDeclaration>
</Variables>
<DefaultAttribute name="title">
<DefaultValue>
<Variable name="title" />
</DefaultValue>
</DefaultAttribute>
<DefaultAttribute name="format">
<DefaultValue>text/xml</DefaultValue>
</DefaultAttribute>
<DefaultAttribute name="state_name">
<DefaultValue>Draft</DefaultValue>
</DefaultAttribute>
</ObjectMappingRule>
</ComponentRules>
<LinkRules>
<Reference rules="topic-content-rules.xml" />
</LinkRules>
</xc:XMLContentRules>
```

Household-item-content-rules.xml

FIG. 16

DOCUMENT SPECIALIZATION PROCESSING IN A CONTENT MANAGEMENT SYSTEM

BACKGROUND

1. Technical Field

This disclosure generally relates to content management systems, and more specifically relates to processing documents in a content management system.

2. Background Art

Darwin Information Typing Architecture (DITA) is an XML-based architecture for authoring, producing, and delivering technical information in a variety of forms. DITA was introduced by International Business Machines Corporation in 2001, and since that time has become standardized and generally accepted as a viable technical documentation framework in a variety of industries. DITA is a powerful architecture for dividing content into small, self-contained topics that can be reused. DITA supports specialization, which allows base types to be extended, or specialized, as needed for specific purposes. In this manner a single DITA element may be customized via specializations to different uses.

Content management systems (CMSs) have been developed and allow many users to efficiently share electronic content such as text, audio files, video files, pictures, graphics, etc. Content management systems typically control access to content in a repository. A user may generate content, and when the content is checked into the repository, the content may be subsequently processed by the CMS according to predefined rules. A user may also check out content from the repository, or link to content in the repository while generating content. The rules in a CMS assure that content that comes into or out of the system or that is linked to meets desired criteria specified in the rules.

To date, there has not been an effective way to merge the features of CMS relationship management and rule processing with the benefits of DITA specialization. This is because known content management systems do not adequately support the seamless integration of specialized DITA artifacts with their associated base DITA artifacts. Namely, there is a lack of formal binding between a specialization and its base type(s), as well as a lack of automatic inheritance of applicable base content rules when the specialization is created in the CMS. Without a way for a content management system to process DITA specializations more intelligently, the benefits of using the DITA architecture in a content management system will not be fully realized.

BRIEF SUMMARY

A content management system (CMS) provides a DITA specialization processing mechanism that provides the full functions of a content management system across the full functionality of the DITA architecture. A DITA specialization is used to generate an import descriptor that describes how to import the DITA specialization, which may include required modules, stylesheets, catalogs, and content rules into the repository of a content management system. When the DITA specialization is imported into the repository, a compound document is created with appropriate parent/child links. Dependency relationships between modules in the compound document are then created. In addition, new XML content rules for the DITA specialization may be automatically generated from existing content rules.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 7 is a sample XML document generated from a DITA specialization module in the content management system in FIG. 1;

FIGS. 8 and 9 are different portions of a sample DITA Household-item specialization module to illustrate the features of the DITA specialization processing mechanism in FIG. 1;

FIG. 10 is a sample DTD corresponding to the sample DITA specialization shown in FIGS. 8 and 9;

FIG. 11 is a sample import descriptor for the DITA specialization module in FIGS. 8 and 9;

FIG. 14 shows sample content rules for a DITA Topic type;

FIG. 15 shows sample content rules for a DITA Concept type; and

FIG. 16 shows sample content rules for the Household-item specialization module shown in FIGS. 8 and 9.

DETAILED DESCRIPTION

The DITA architecture and content management systems have developed somewhat independently of each other. As a result, there is currently no known content management system that fully supports DITA specializations with respect to CMS relationship management and content rule processing. The disclosure and claims herein provide a content management system that supports tighter integration with DITA specializations by generating an import descriptor that describes how to import a DITA-based DTD and its associated collection of artifacts into the repository of the content management system. Once imported, a compound CMS document is created with appropriate parent/child links based on the DITA-based DTD and its associated artifacts, and formal CMS dependencies between modules in the compound document are created. In addition, XML content rules may be automatically generated for the DITA specialization based on existing content rules.

Figure 1:
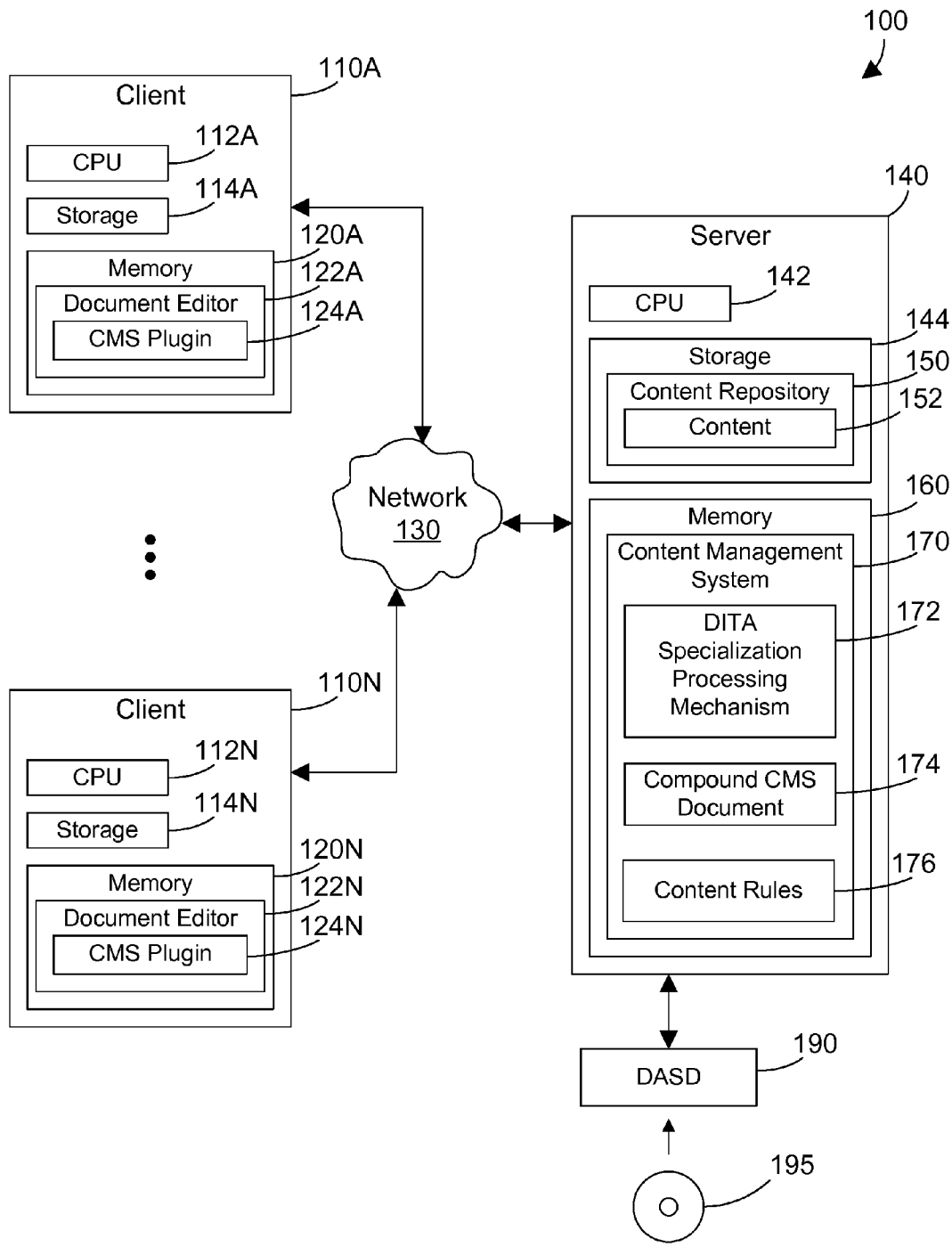
FIG. 1 is a block diagram of a networked computer system that includes a server computer system that has a content management system that includes a DITA specialization processing mechanism that provides full DITA support in the content management system.

Referring to FIG. 1, networked computer system 100 includes multiple clients, shown in FIG. 1 as clients 110A, ..., 110N, coupled to a network 130. Each client preferably includes a CPU, storage, and memory that contains a document editor and a content management system (CMS) plugin. Thus, client 110A includes a CPU 112A, storage 114A, memory 120A, a document editor 122A in the memory 120A that is executed by the CPU 112A, and a CMS plugin 124A that allows the document editor 122A to interact with content 152 in the repository 150 that is managed by the CMS 170 in server 140. In similar fashion, other clients have similar components shown in client 110A, through client 110N, which includes a CPU 112N, storage 114N, memory 120N, a document editor 122N, and a CMS plugin 124N.

The CMS 170 resides in the main memory 160 of a server computer system 140 that also includes a CPU 142 and storage 144 that includes a content repository 150 that holds content 152 managed by the CMS 170. One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes a DITA specialization processing mechanism 172, a compound CMS document 174, and content rules 176. The DITA specialization processing mechanism processes a DITA specialization such that full DITA support is provided by the content management system 170. The compound CMS document 174 is constructed by the DITA specialization processing mechanism 172. The order of modules in the compound CMS document 174 is according to a hierarchy specified in a DITA specialization module. The compound CMS document 174 also includes one or more dependency relationships between modules, where the dependency relationships are preferably formal CMS relationships between the modules. Compound CMS document 174 is one suitable example of content 152 that may be stored in the content repository 150.

Content rules 176 represent known types of content rules in known content management systems. Known content management systems may include rules related to bursting, linking, and synchronization. Bursting rules govern how a document is bursted, or broken into individual chunks, when the document is imported or checked into the repository. By bursting a document into chunks, the individual chunks may be potentially reused later by a different author. Linking rules are used for importing and associating objects related to a CMS document based on particular elements or attributes from the document as specified by the rules. For example, an XML document that references external images can take advantage of linking rules so that relationships between the XML content and the external images are automatically created when the document is imported or checked into the repository. Another kind of linking rule governs what content in a repository a user may link to in a document that will be subsequently checked into the repository. Synchronization rules govern synchronization between content and metadata related to the content. For example, a synchronization rule may specify that whenever a specified CMS attribute is changed, a particular piece of XML in the content should be automatically updated with that attribute's value.

The content rules 176 in FIG. 1 may include any or all of bursting rules, linking rules, synchronization rules, or other rules, whether currently known or developed in the future. Content rules 176 preferably include rules that are defined manually by a user or administrator of the content management system 170. In addition, content rules 176 may additionally include content rules that are automatically generated for a DITA specialization module as explained in more detail below.

In FIG. 1, repository 150 is shown separate from content management system 170. In the alternative, repository 150 could be within the content management system 170. Regardless of the location of the repository 150, the content management system 170 controls access to and manages content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, ..., 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 160 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 160, storage 144 and DASD device 190. Therefore, while data, the operating system, and content management system 170 may reside in main memory 160, those skilled in the art will recognize that these items are not necessarily all completely contained in main memory 160 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 160. Main memory 160 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

The content management system may also be delivered as part of a service engagement with a client corporation, non-profit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
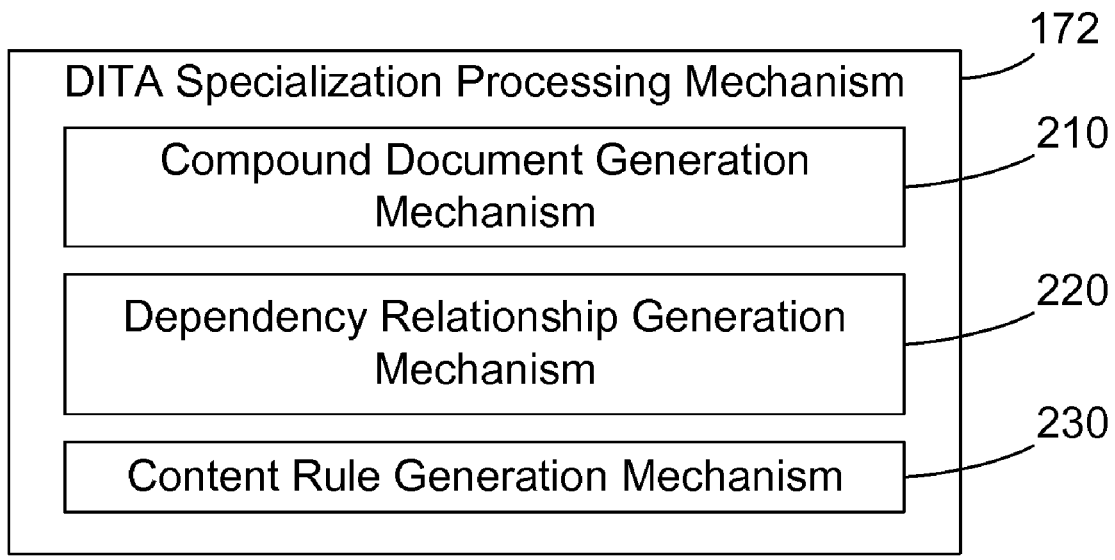
FIG. 2 is a block diagram showing details of the DITA specialization processing mechanism 172 shown in FIG. 1.

Referring to FIG. 2, the DITA specialization processing mechanism 172 in FIG. 1 may include a compound document generation mechanism 210, a dependency relationship generation mechanism 220, and a content rule generation mechanism 230. The compound document generation mechanism 210 generates from the DITA specialization module a compound document in the repository that includes an order of modules as specified in the DITA specialization module and corresponding DTD. Note there are known mechanisms for generating a compound document using an import descriptor, so compound document generation mechanism 210 may employ methods known in the art. The dependency relationship generation mechanism 220 generates formal CMS relationships between modules referenced in the DITA specialization module, thereby providing full CMS capability with the DITA specialization module. For example, these relationships provide referential integrity between related modules. That is, if two modules are bound by a CMS relationship, the system can be configured to prevent one or both of the modules from being deleted without proper warning. The content rule generation mechanism 230 may be used to automatically generate one or more content rules for the DITA specialization module based on existing content rules for parent modules.

Figure 3:
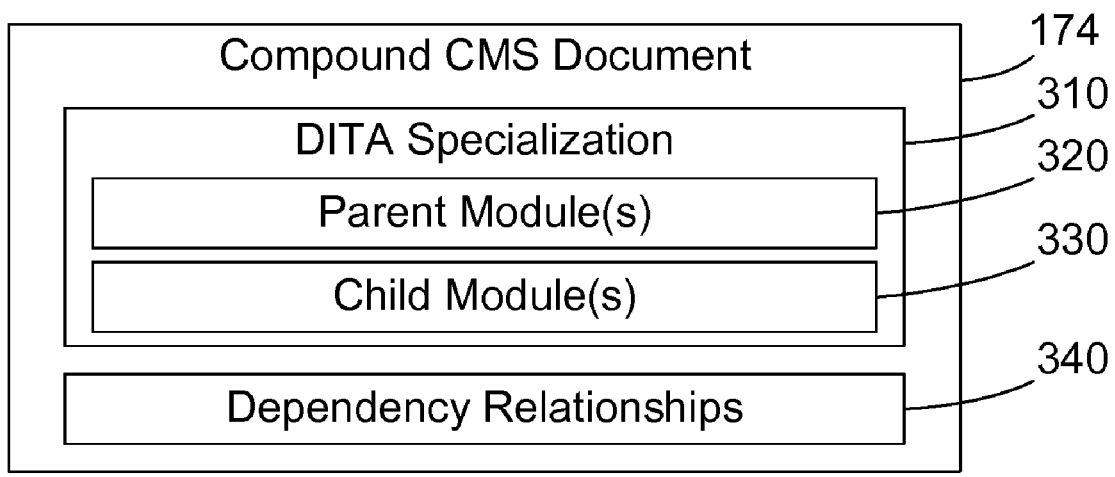
FIG. 3 is a block diagram showing details of the compound CMS document 174 shown in FIG. 1.

Referring to FIG. 3, the compound CMS document 174 shown in FIG. 1 preferably includes the DITA specialization module 310 in a form of a document in the repository of the content management system. DITA specialization module 310 preferably includes one or more parent modules 320 and one or more child modules 330 that may or may not already exist as documents in the content management system repository. The compound CMS document 174 also includes one or more dependency relationships 340, which are formal CMS relationships between documents (modules) in the repository. Note the dependency relationships 340, while shown in FIG. 3 as part of the compound CMS document 174, may be implemented as one or more objects that are separate from the compound CMS document 174.

Figure 4:
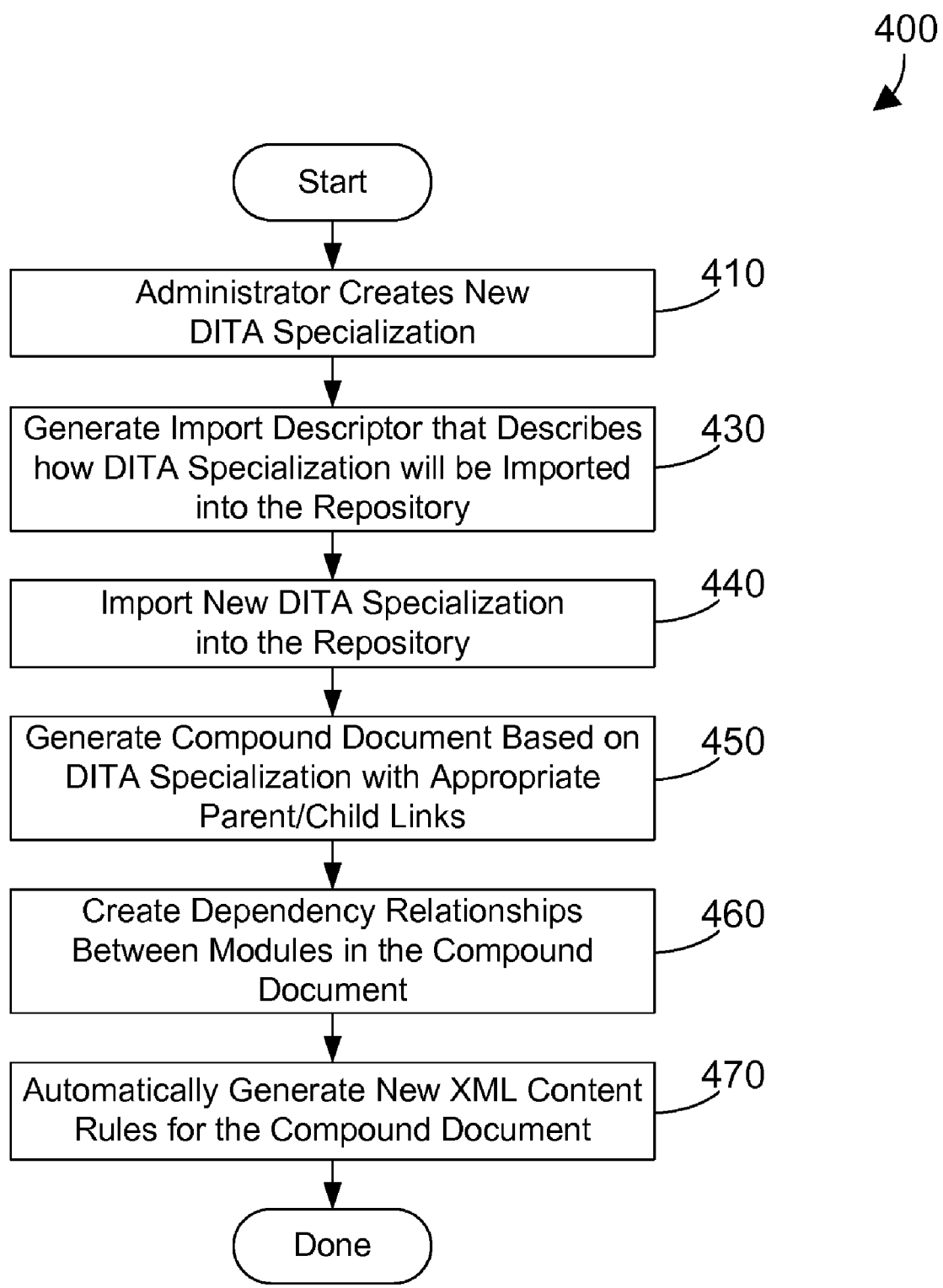
FIG. 4 is a flow diagram of a method for processing DITA specializations in a way that provides full support of the DITA architecture in a content management system.

Referring to FIG. 4, a method 400 begins by an administrator creating a new DITA specialization (step 410). In one specific implementation of step 410, the administrator creates a DITA specialization that comprises a DITA specialization module and a corresponding DITA-based DTD. For this specific implementation, it is the combination of the DITA specialization module and its corresponding DTD that defines a DITA specialization. Next, an import descriptor is generated from the DITA specialization (step 430). The generation of the import descriptor may be done by an administrator, or may be done via an automated tool such as a tool a system administrator uses to create a DITA specialization. The import descriptor describes how the DITA specialization will be imported into the repository. The DITA specialization is then imported into the repository, and a compound document is generated based on the import descriptor with appropriate parent/child links (step 450). This means that each component described by the import descriptor is preferably a separate document in the repository of the content management system, and the parent/child links relate these documents to the compound document. Dependency relationships are then created in the form of formal CMS relationships between modules in the compound document (step 460). New XML content rules may then be automatically generated based on existing XML content rules that are defined for one or more parent modules in the compound document (step 470). Note that step 470 is optional, and need not necessarily be performed. Note also that steps 460 and 470 are steps that are preferably performed by the DITA specialization processing mechanism 172 in FIG. 1.

Figure 5:
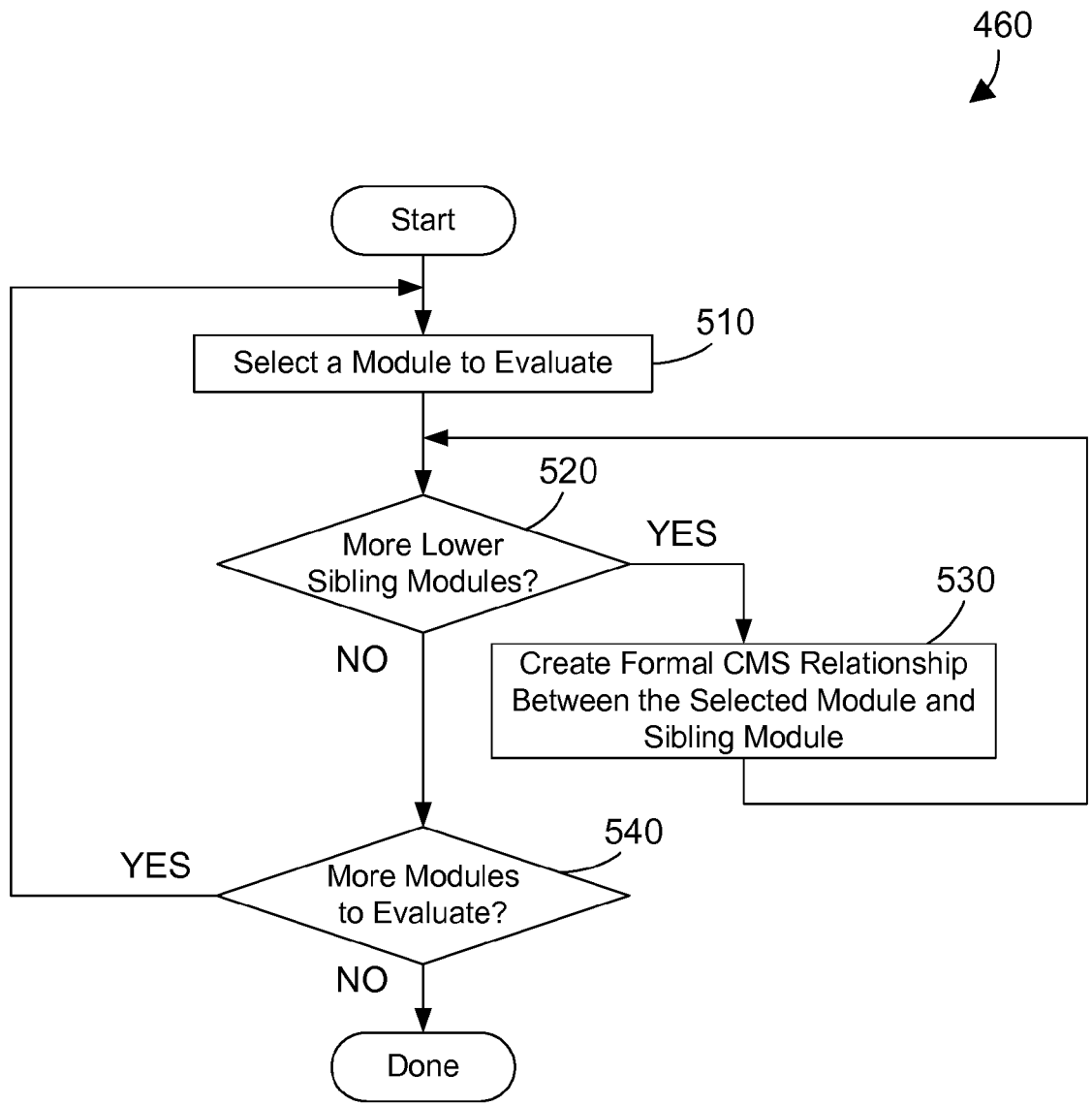
FIG. 5 is a flow diagram of one specific sample implementation for step 460 in FIG. 4.

Referring to FIG. 5, a method 460 represents one suitable implementation for step 460 in FIG. 4. A module is selected for evaluation (step 510). If there are more lower sibling modules specified in the import descriptor (step 520=YES), a formal CMS relationship is created between the selected module and the sibling module (step 530). Note the term "sibling module" used herein denotes siblings specified in the import descriptor, and these modules may have other relationships (e.g., parent/child) from the DITA perspective. If there are no more lower sibling modules to evaluate (step 520=NO), and if there are more modules to evaluate (step 540=YES), method 460 loops back to step 510 and continues until there are no more modules to evaluate (step 540=NO).

Figure 6:
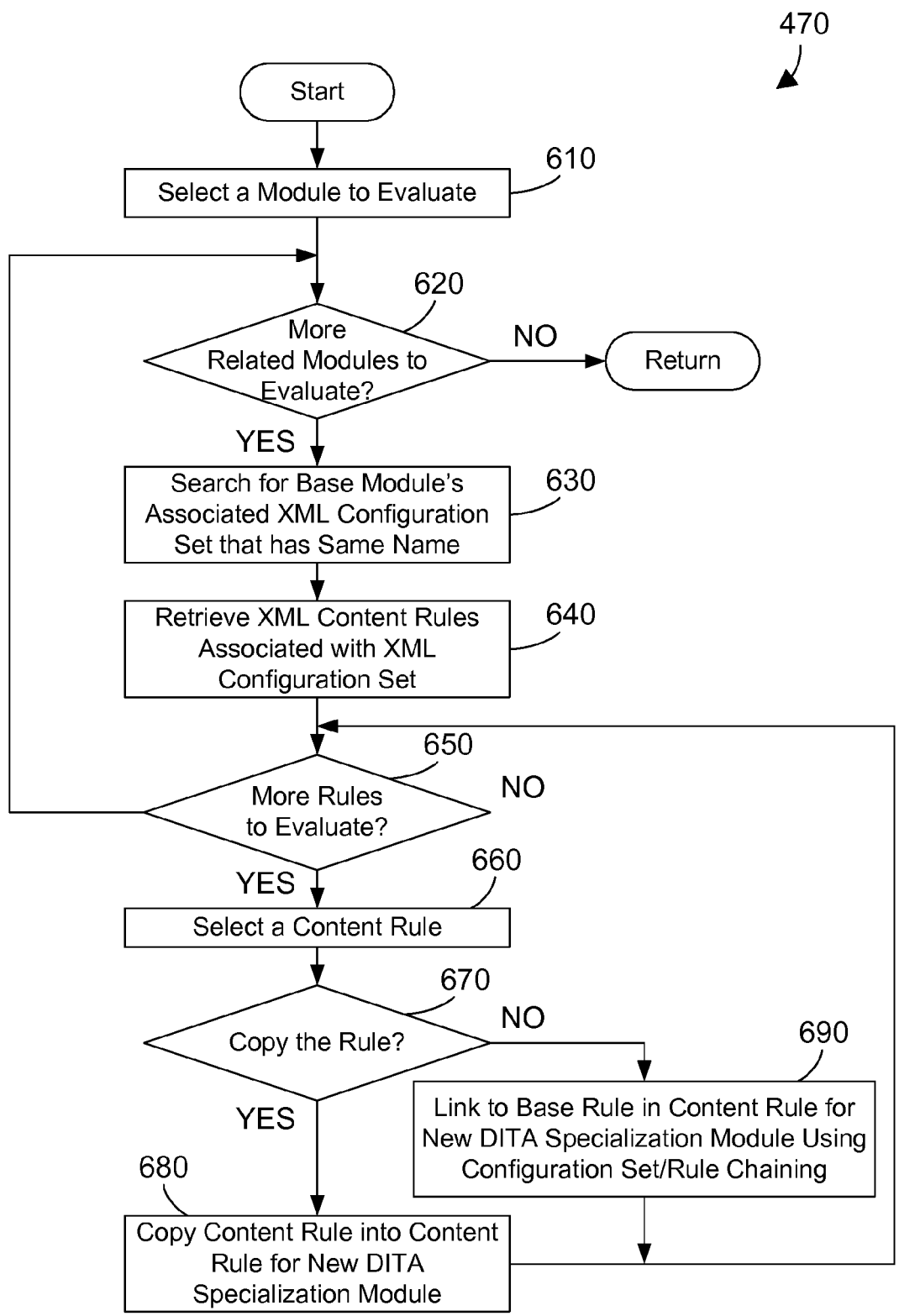
FIG. 6 is a flow diagram of one specific sample implementation for step 470 in FIG. 4.

Referring to FIG. 6, a method 470 represents one suitable implementation for step 470 shown in FIG. 4. A module is selected for evaluation (step 610). If there are more related modules to evaluate (step 620=YES), search for the base module's associated compound document (i.e., XML configuration set) that has the same name (step 630). The set of content rules (if any) associated with the base module's compound document is then retrieved (step 640). If there are more rules to evaluate (step 650=YES), a content rule is selected (step 660). If the rule is to be copied (step 670=YES), the content rule from the base module is copied as a content rule for the DITA specialization module (step 680). Note that this mechanism copies the content rule such that the new content rule conforms to the specialized grammar. For example, if a content rule is defined with an element name used by the base module then the copied rule would be altered to reflect the appropriate element name used by the specialized module. If the rule is not to be copied (step 670=NO), a link to the rule is created in the content rules for the DITA specialization module (step 690). Note the decision of whether or not to copy a content rule in step 670 may be made by consulting a suitable policy that defines when copying or linking of content rules is appropriate. If there are more rules to evaluate (step 650=YES), method 470 loops back to step 650 and continues. Once all rules for the selected module have been evaluated (step 650=NO), method 470 loops back to step 620. If there are more related modules to evaluate (step 620=YES), method 470 continues at step 630. If there are no more related modules to evaluate (step 620=NO), method 470 is done.

A simple example is now given to illustrate many of the concepts discussed above. FIG. 7 shows a sample XML document that could be generated using one or more DITA specializations. In this specific example, a DITA specialization comprises a DITA specialization module and a corresponding DITA-based DTD. It is helpful to look at a complete instance to understand DITA specializations. In the XML document in FIG. 7, the following elements are specialized, as shown in the DITA specialization module in FIGS. 8 and 9 and in the corresponding DTD in FIG. 10: household-item is a specialization of the concept element from the concept document type; item-name is a specialization of the title element from the concept document type; and item-use is a specialization of the conbody element from the concept document type. These relationships are shown by the ATTRLIST declarations starting at 910 in FIG. 9. Each ATTRLIST is used to define attributes for the given element. The class attribute is what contains the specialization hierarchy. By examining each value for the class attribute, one can determine which specialized element is related to which base types. In addition, the related-links element is not specialized but is used in the example to show a document may have a mixture of specialized and non-specialized elements.

An administrator creates the DITA specialization by creating two items, the DITA specialization module, which is shown in FIGS. 8 and 9, and the corresponding DTD shown in FIG. 10. The DITA specialization module in FIGS. 8 and 9 shows how the new DTD specialization type derives from its base types, as shown in the ATTRLIST declarations at 910 in FIG. 9. DITA specialization modules and DTDs are well-known in the art, so details of how specialization is accomplished using DITA specialization modules and DTDs are not discussed in detail herein.

For the sake of simplicity, we assume the DITA "topic" and "concept" specialization modules and corresponding DTDs are already stored in the repository of the content management system. We also assume the administrator has previously created and stored in the repository a compound document known as an XML configuration set for each of the "topic" and "concept" DITA types. We further assume each compound document includes an XML content rules file. Thus, the compound document for "topic" includes the rules for processing topic instances, and the compound document for "concept" includes the rules for processing concept instances. Sample content rules for "topic" are shown in FIG. 14. Sample content rules for "concept" are shown in FIG. 15. Note the XML content rules in FIG. 14 for "topic" include a link rule at 1410 that serves to import any document linked to by the <link href="some_document"/> element. The XML content rules in FIG. 15 for "concept" include a component rule at 1510 that serves to burst <title> elements from concept documents into their own documents in the repository.

Figure 12:
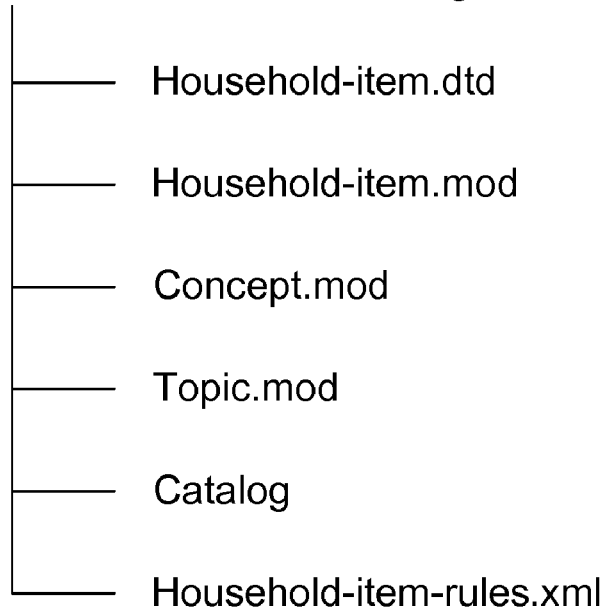
FIG. 12 is a hierarchical view of a sample compound CMS document 174 shown in FIG. 1.

We now assume the administrator generates an import descriptor for the new DITA specialization module, shown in FIG. 11. The import descriptor describes how to import the DITA specialization into the repository. The <CompoundDocument> element describes the compound document which will be created. Under this element there are several <LinkedComponent> elements, which describe each child of the compound document. A <LinkedComponent> with a location attribute represents a document which has not yet been created in the repository (i.e., the location tells the system that it should import the document from the specified local path), while a <LinkedComponent> with an objectId attribute represents a document which already exists in the repository. The <Attribute> elements describe attributes to apply to the compound document when it is created in the repository. The DITA specialization (comprising for this example the DITA specialization module and corresponding DTD) is then imported, and the DITA specialization processing mechanism generates a compound document with the appropriate parent/child links as specified in the import descriptor. FIG. 12 shows a sample hierarchy diagram for the compound document for Household-item, referred to herein as Household-item XML Configuration Set. The XML for the configuration set in FIG. 12 is not shown to simplify the figure. The hierarchy diagram in FIG. 12 shows a specific order that is significant, as defined by the import descriptor (which was generated based on the specialization hierarchy). The Household-item.dtd (DTD file) is at the first level, which is shown in FIG. 10. Next is the Household-item.mod file (DITA specialization module), shown in FIGS. 8 and 9. Next is the Concept.mod file, followed by Topic.mod, Catalog and Household-item-rules.xml.

Figure 13:
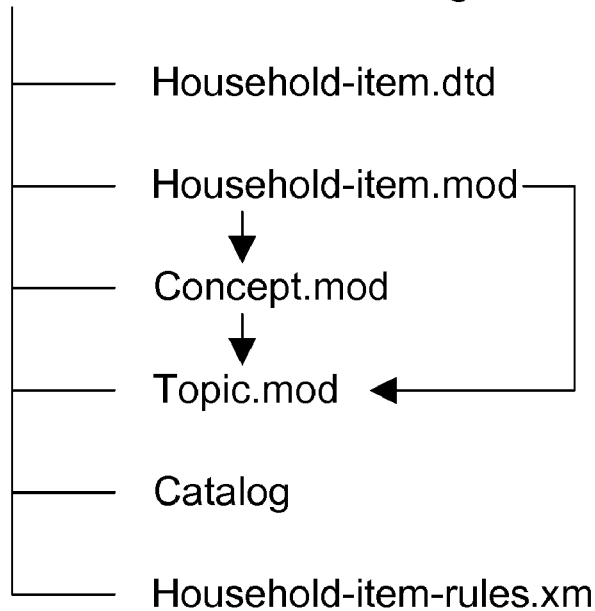
FIG. 13 is a hierarchical view of the sample compound CMS document in FIG. 12 after the dependency relationships have been added (e.g., step 460 in FIG. 4)

Because the order of the modules shown in FIG. 12 is significant based on the DITA specialization (i.e., Household-item.mod and Household-item.dtd), the order of modules in FIG. 12 implies a hierarchical relationship between modules. As a result, the DITA specialization processing mechanism can create relationships between modules in FIG. 12 as shown in FIG. 13. The DITA specialization processing mechanism inspects the newly imported Household-item specialization module, and looks at each class attribute defined for the specialized elements. These attribute definitions are under the SPECIALIZED ATTRIBUTE DECLARATIONS section of the Household-item specialization at 910 in FIG. 9. For each class declaration, the system starts with the right-most part of the string (e.g., household-item/household-item for the first declaration). The system then reads the declaration moving left. For each type it encounters it searches the repository or looks in the import descriptor (if the type is not yet in the repository) for a corresponding module document with that name (e.g., Concept.mod). When the system finds the module it creates a relationship between this specialized module (i.e., Household-item.mod) and the base module (i.e., Concept.mod), as shown by the arrow from Household-item.mod to Concept.mod in FIG. 13. It continues to read the rest of the declaration until there are no more modules. In this example, relationships will be created between Household-item.mod and Concept.mod, and between Household-item.mod and Topic.mod, as shown by the arrows from Household-item.mod in FIG. 13. In addition, this process also ensures that all base modules are appropriately related. For instance, if the Concept and Topic types were not previously bound by a relationship, this process would also create a relationship between those two types, as shown by the arrow from Concept.mod to Topic.mod in FIG. 13.

Next the system ensures that the specialized type correctly inherits XML content rules from its base types (described above). The system again starts by inspecting the newly imported specialized module (Household-item.mod) and reading the class declaration for each of the specialized elements. As each base type is discovered the system determines if the type has an associated compound document (e.g., XML configuration set) which contains XML content rules. If it does, each rule in the XML content rules file is interrogated. A policy is then used to determine what to do with each rule from the base types—either copy the rule to the specialized type's XML content rules, or create a reference from the specialized XML content rules to the base XML content rules. Let's say for this example that the link rule at 1410 from the Topic-content-rules.xml file in FIG. 14 is linked to, while the component rule at 1510 from the Concept-content-rules.xml file in FIG. 15 is copied to the Household-item-content-rules.xml file. Notice that the XPath expression was updated during the copy so that the new specialized elements are used in the expression in place of the base elements.

The content management system disclosed and claimed herein provides improved support for DITA specializations. DITA specializations are processed according to an import descriptor that describes how to import the DITA specializations into the repository. A compound document is created, and appropriate dependency relationships are established between modules in the compound document. In addition, XML content rules may be automatically generated from existing content rules of parent modules in the compound document. In this manner a content management system is more tightly integrated with DITA specializations, allowing the power of both DITA specializations and content management systems to be merged, providing a solution that is more powerful than prior art solutions.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the examples in the figures and discussed above related to XML documents, the disclosure and claims herein expressly extend to content management systems that handle any suitable type of content, whether currently known or developed in the future.

What is claimed is:

1. An apparatus comprising:
   at least one processor;
   a memory coupled to the at least one processor;
   a repository residing in the memory that includes a plurality of documents; and
   a content management system residing in the memory and executed by the at least one processor, the content management system managing the plurality of documents in the repository, the content management system comprising:
   a Darwin Information Typing Architecture (DITA) specialization processing mechanism that receives a DITA specialization that comprises a DITA specialization module and a corresponding document type definition (DTD), receives an import descriptor that describes how the DITA specialization is imported into the repository, imports the DITA specialization into the repository according to the import descriptor, generates a compound document based on the DITA specialization with a plurality of modules that each comprise a document in the repository and with appropriate parent/child links between the plurality of modules as specified in the DITA specialization, and generates a plurality of formal relationships in the content management system between the plurality of modules in the compound document by performing the steps of:
   (A) selecting a module to evaluate;
   (B) if there is a lower sibling module in the compound document as specified in the import descriptor, creating a formal relationship in the content management system between the selected module and the lower sibling module;
   (C) if there is no lower sibling module, determining whether there are more modules to evaluate, and if so, returning to step (A);
   the DITA specialization processing mechanism automatically generating a plurality of new content rules for the compound document by performing the steps of:
   (1) selecting a module to evaluate;
   (2) determining a base module corresponding to the selected module;
   (3) if the base module has a corresponding content rule that is allowed to be copied according to a defined policy, copying the corresponding content rule into content rules for the selected module;
   (4) if the base module has a corresponding content rule that is not allowed to be copied according to the defined policy, creating a link to the corresponding content rule in the content rules for the selected module;
   (5) if there are more modules to evaluate, returning to step (1).

2. A computer-implemented method for a content management system that manages a plurality of XML documents in a repository to process a Darwin Information Type Architecture (DITA) specialization that comprises a DITA specialization module and a corresponding document type definition (DTD), the method comprising the steps of:
   receiving the DITA specialization module;
   receiving the DTD corresponding to the DITA specialization module;
   receiving an import descriptor that describes how the DITA specialization is imported into the repository;
   importing the DITA specialization into the repository according to the import descriptor;
   generating a compound document based on the DITA specialization with a plurality of modules that each comprise a document in the repository and with appropriate parent/child links between the plurality of modules as specified in the DITA specialization;
   generating a plurality of formal relationships in the content management system between the plurality of modules in the compound document by performing the steps of:
   (A) selecting a module to evaluate;
   (B) if there is a lower sibling module in the compound document as specified in the import descriptor, creating a formal relationship in the content management system between the selected module and the lower sibling module;
   (C) if there is no lower sibling module, determining whether there are more modules to evaluate, and if so, returning to step (A);
   automatically generating a plurality of new content rules for the compound document by performing the steps of:
   (1) selecting a module to evaluate;
   (2) determining a base module corresponding to the selected module;
   (3) if the base module has a corresponding content rule that is allowed to be copied according to a defined policy, copying the corresponding content rule into content rules for the selected module;
(4) if the base module has a corresponding content rule that is not allowed to be copied according to the defined policy, creating a link to the corresponding content rule in the content rules for the selected module;
(5) if there are more modules to evaluate, returning to step (1).

3. An article of manufacture comprising:
a content management system that manages a plurality of documents in a repository, the content management system comprising:
a Darwin Information Typing Architecture (DITA) specialization processing mechanism that receives a DITA specialization that comprises a DITA specialization module and a corresponding document type definition (DTD), receives an import descriptor that describes how the DITA specialization is imported into the repository, imports the DITA specialization into the repository according to the import descriptor, generates a compound document based on the DITA specialization with a plurality of modules that each comprise a document in the repository and with appropriate parent/child links between the plurality of modules as specified in the DITA specialization, and generates a plurality of formal relationships in the content management system between the plurality of modules in the compound document by performing the steps of:
(A) selecting a module to evaluate;
(B) if there is a lower sibling module in the compound document as specified in the import descriptor, creating a formal relationship in the content management system between the selected module and the lower sibling module;
(C) if there is no lower sibling module, determining whether there are more modules to evaluate, and if so, returning to step (A);
the DITA specialization processing mechanism automatically generating a plurality of new content rules for the compound document by performing the steps of:
(1) selecting a module to evaluate;
(2) determining a base module corresponding to the selected module;
(3) if the base module has a corresponding content rule that is allowed to be copied according to a defined policy, copying the corresponding content rule into content rules for the selected module;
(4) if the base module has a corresponding content rule that is not allowed to be copied according to the defined policy, creating a link to the corresponding content rule in the content rules for the selected module;
(5) if there are more modules to evaluate, returning to step (1); and
non-transitory computer-readable media bearing the content management system.

* * * * *